United States Patent [19]
Feist

[11] Patent Number: 5,096,635
[45] Date of Patent: Mar. 17, 1992

[54] METHOD OF TEMPERING CARBONIFEROUS BLANKS IN AN AUTOCLAVE

[75] Inventor: Horst J. Feist, Hardheim, Fed. Rep. of Germany

[73] Assignee: Feist Intertec AG, Biel, Switzerland

[21] Appl. No.: 629,638

[22] Filed: Dec. 19, 1990

[30] Foreign Application Priority Data

Dec. 20, 1989 [DE] Fed. Rep. of Germany ....... 3941978

[51] Int. Cl.$^5$ .................. B29C 71/02; C01B 31/02
[52] U.S. Cl. ................... 264/40.3; 264/29.6; 264/29.7; 264/82; 264/85; 264/101; 264/105; 423/210; 423/242; 423/245.1; 423/449; 431/3; 431/5
[58] Field of Search .............. 264/29.1, 29.5, 29.6, 264/29.7, 40.1, 40.3, 82, 85, 101, 105; 423/445, 449, 210, 242, 245.1; 431/3, 5

[56] References Cited

U.S. PATENT DOCUMENTS

| | | | |
|---|---|---|---|
| 3,504,065 | 3/1970 | Edstrom | 423/449 |
| 4,185,055 | 1/1980 | Barrilon et al. | 264/29.5 |
| 4,698,010 | 10/1987 | Toncelli | 264/85 X |
| 4,942,002 | 7/1990 | Feist | 264/27 |

*Primary Examiner*—Leo B. Tentoni
*Attorney, Agent, or Firm*—Peter K. Kontler

[57] ABSTRACT

Cold carbon-containing blanks which are impregnated with a carbon-containing material are introduced into a cold autoclave which is thereupon sealed and filled with inert gas prior to heating of the interior of the autoclave to tempering temperature. The tempered products are cooled in and thereupon removed from the autoclave, and the inert gas is relieved of hydrocarbons and other harmful substances which are released by the impregnating material during tempering.

19 Claims, 1 Drawing Sheet

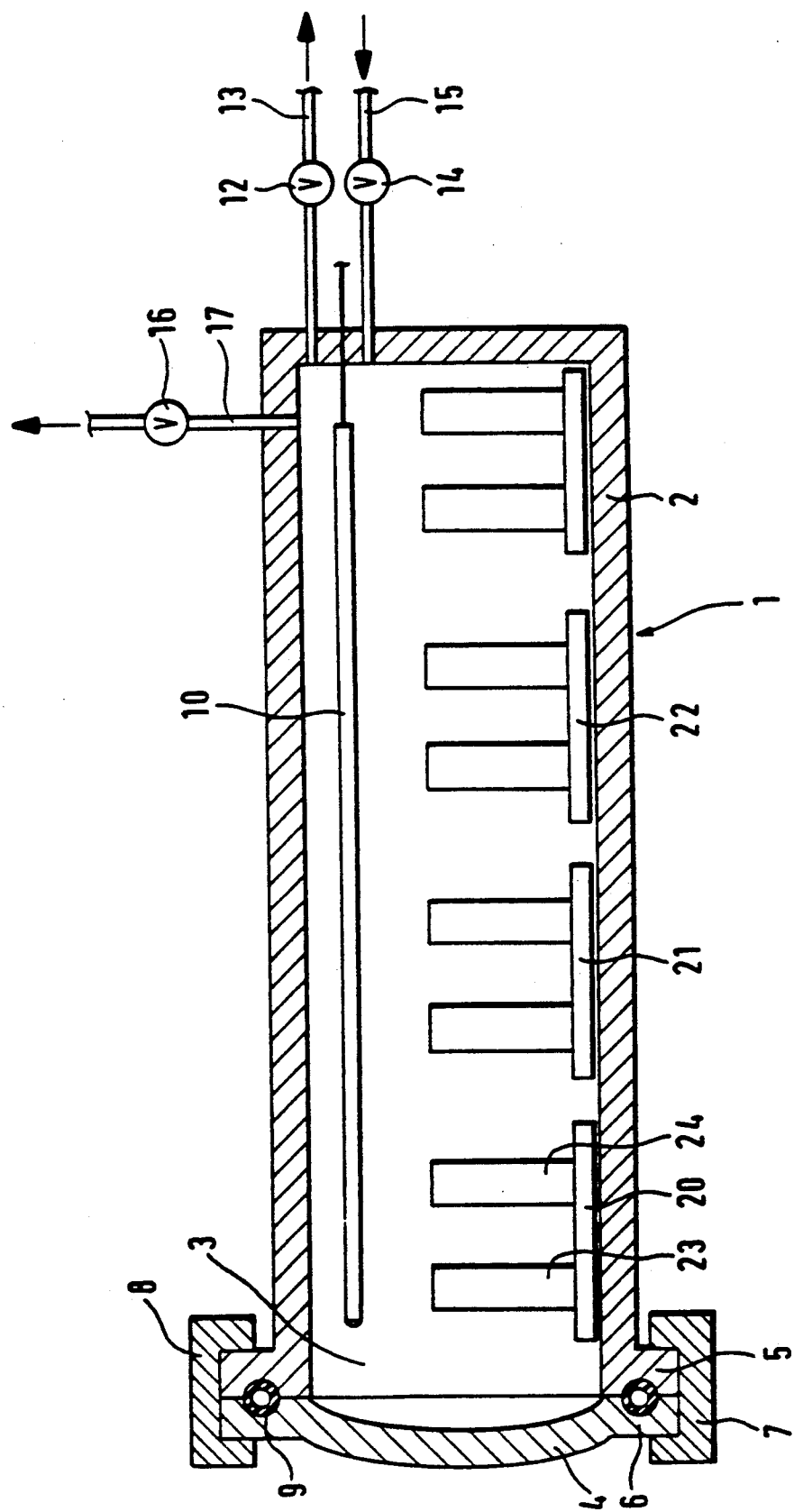

METHOD OF TEMPERING CARBONIFEROUS BLANKS IN AN AUTOCLAVE

BACKGROUND OF THE INVENTION

The invention relates to methods of treating carboniferous blanks which are impregnated with materials tending to release harmful substances in the course of treatment, and more particularly to improvements in a method of tempering carbon-containing blanks which are impregnated with carbonaceous materials tending to release hydrocarbons, sulfur-containing gases and/or other harmful substances in the course of treatment of blanks in a sealed autoclave.

It is well known to produce fireproof bricks, graphite electrodes and like commodities by tempering in an autoclave suitable carbon-containing blanks which are impregnated with pitch or other carboniferous material. The tempering involves heating the blanks in the autoclave which, in turn, induces the impregnating material to release hydrocarbons, sulphur and/or other harmful substances at normal pressure (approximately $10^5$ Pascal) as soon as the temperature rises above a threshold value of approximately 300° C. The treatment in the autoclave involves introducing the blanks into the autoclave, sealing the autoclave, admitting into the autoclave a process gas, heating the interior of the autoclave to tempering temperature, and cooling the tempered products. Heretofore known methods are not entirely satisfactory because it is difficult, if not impossible, to intercept all harmful substances which are released by the impregnating material as a result of heating to and above the threshold temperature which is below the tempering temperature.

A method of continuously converting carbon blanks into graphite electrodes is disclosed in commonly owned U.S Pat. No. 4,942,002.

OBJECTS OF THE INVENTION

An object of the invention is to provide a novel and improved method of tempering carboniferous blanks which are impregnated with carbonaceous materials and are confined in an autoclave for heating to tempering temperature.

Another object of the invention is to provide a method which renders it possible to intercept all or nearly all noxious substances which are released during heating of blanks in the autoclave.

A further object of the invention is to provide a method which renders it possible to prevent the escape of harmful substances into the atmosphere around the autoclave.

An additional object of the invention is to provide a method which renders it possible to relieve the process gas of all or nearly all harmful substances prior to evacuation of process gas from the autoclave.

Still another object of the invention is to provide a method which can be practiced by resorting to simple and inexpensive apparatus.

A further object of the invention is to provide a novel and improved method of making fireproof bricks, graphite electrodes and similar commodities without any, or without appreciable, contamination of the environment.

SUMMARY OF THE INVENTION

The invention resides in the provision of a method of tempering carboniferous blanks which are impregnated with a carbonaceous impregnating material that releases hydrocarbons and/or other harmful substances at normal pressure and above a threshold temperature (such threshold temperature is normally close to 300° C.). The improved method can be practiced for the making of fireproof bricks, graphite electrodes and like commodities from carboniferous blanks which are impregnated with pitch. A presently preferred embodiment of the method comprises the steps of confining one or more blanks in the interior of an autoclave, sealing the autoclave, reducing the pressure in the sealed autoclave below atmospheric pressure, thereupon admitting into the autoclave a process gas (preferably an inert gas, such as nitrogen) to raise the pressure in the autoclave above atmospheric pressure, raising the temperature in the sealed and gas-filled autoclave to tempering temperature above the threshold temperature and maintaining the tempering temperature for an interval of time which is sufficient to ensure that at least the major portion of each confined blank is heated to such tempering temperature, interrupting the maintaining step and cooling the interior of the autoclave to a third temperature which does not exceed and can be below the threshold temperature, thereupon reducing the pressure in the autoclave at least substantially to atmospheric pressure including evacuating process gas from the interior of the autoclave, thereupon opening (unsealing) the autoclave, and removing the tempered and cooled blank or blanks from the autoclave.

The aforementioned normal pressure is or can be approximately $10^5$ Pascal, and the temperature of blanks prior to the autoclave sealing step is preferably below the threshold temperature of approximately 300° C.

The method preferably further comprises the steps of continuously monitoring the pressure in the interior of the sealed autoclave, withdrawing process gas from the autoclave when the pressure rises above a predetermined maximum value, and terminating or interrupting the withdrawing step when the monitored pressure drops below the maximum value. The maximum value of pressure in the interior of the autoclave can match or approximate a maximum permissible internal pressure in the autoclave, particularly a maximum permissible internal pressure which can be maintained for extended periods of time. Alternatively, the maximum value can be at least slightly below the maximum permissible internal pressure in the autoclave.

The method can further comprise the step of introducing additional process gas into the autoclave in the course of the maintaining step, i.e., while the temperature in the interior of the autoclave is being raised to and is maintained at tempering temperature. The introducing step and/or the admitting step can include raising the pressure in the autoclave to a value which suffices to ensure that, at the tempering temperature, the pressure in the autoclave is slightly less than the maximum permissible internal pressure in the autoclave.

The blanks can be impregnated with a material having a coking temperature below the tempering temperature, and the admitting and/or introducing step then preferably includes raising the pressure in the autoclave to a value such that the pressure in the autoclave rises to a predetermined operating pressure in response to heating of the interior of the autoclave to a temperature which is between the coking and tempering temperatures. Such method can further comprise the step of withdrawing some process gas from the autoclave, while the temperature in the autoclave rises toward the tempering temperature, in order to maintain the operating pressure at or close to a constant value.

The method can also comprise the step of cleaning the evacuated process gas; such cleaning step can include thermal afterburning.

The impregnating material releases into the process gas one or more condensable ingredients in the course of the temperature raising and maintaining steps, and the method can further comprise the step of condensing at least some condensable ingredients in the autoclave prior to the evacuating step.

The pressure in the autoclave can be maintained at $10^6$ to $10^8$ Pascal (preferably between $10^6$ and $10^7$ Pascal) in the course of the maintaining step.

The raising and maintaining steps preferably include coking at least 35 percent by weight (most preferably at least 40 percent by weight) of carbonaceous impregnating material in the confined blank or blanks.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawing.

BRIEF DESCRIPTION OF THE DRAWING

The single FIGURE of the drawing is a schematic longitudinal vertical sectional view of an autoclave which can be utilized for the practice of the improved method, the autoclave being shown in sealed condition and several blanks being shown in the interior of the sealed autoclave.

DESCRIPTION OF PREFERRED EMBODIMENTS

The drawing shows an autoclave 1 which is designed to stand the required internal pressure for required intervals of time as will be described in connection with the Examples I and II. The illustrated autoclave 1 has an elongated housing 2 one end of which is permanently sealed and the open other end 3 of which can be sealed by a detachable closure or lid 4 with assistance from suitable clamping elements in the form of claws 7 and 8. An inflatable annular sealing element 9 is provided between an external ring-shaped flange 5 at the open end 3 of the housing 2 and the adjacent marginal portion 6 of the closure 4. The medium which is used to inflate the sealing element 9 is preferably a hydraulic fluid.

The claws 7 and 8 are actuatable by one or more hydraulic motors (not shown) which are preferably designed to permit detachment of the closure 4 only when the pressure in the interior of the housing 2 matches or closely approximates atmospheric pressure.

The interior of the housing 2 can be heated by a built-in electric heating unit 10 which can be operated from without the autoclave 1. The latter further comprises a conduit 15 which contains a regulating valve 14 and serves to admit process gas into the housing 2, a conduit 13 which contains a regulating valve 12 and serves to permit evacuation or withdrawal of process gas and other flowable substances from the interior of the housing, and a conduit 17 which contains a pressure relief valve 16 serving to prevent a rise of internal pressure above the maximum permissible value.

The drawing further shows pallets 20, 21, 22 which are confined in the interior of the autoclave 1 and support sets (e.g., pairs) of blanks two of which are denoted by reference characters 23 and 24. It is clear that the number of pallets can be reduced to one or two or increased to four or more, and that each pallet can support a single blank or three or more blanks.

EXAMPLE 1

Each blank to be treated contained 80 percent by weight of coke powder and 20 percent by weight of impregnating material, namely black coal pitch. The blanks were to be tempered to constitute fireproof bricks and they were shaped in a press so that their dimensions matched those of the bricks to be obtained therefrom. The blanks were heated to a temperature T1 of 150° C. and confined in the autoclave. The threshold temperature Tg of the blanks was in the range of 300° C. For the purpose of introducing them into the autoclave, the blanks were loaded onto pallets which were placed onto a vehicle for convenient transport into the autoclave. The vehicle was withdrawn prior to sealing of the autoclave. The maximum permissible internal pressure Ph in the autoclave was $10^6$ Pascal.

The next step involved evacuation of air from the sealed autoclave so that the pressure was reduced to Pv = 7000 Pascal. The autoclave was thereupon filled with process gas (nitrogen) to raise the pressure to Ps = $2 \times 10^5$ Pascal. The electric heating unit in the autoclave was operated to raise the temperature to tempering temperature Tt = 740° C. The temperature raising step took up approximately 30 hours, and this involved a rise of pressure to operating pressure Pb = $7 \times 10^5$ Pascal. The rise of pressure was attributable to heating as well as to release of gaseous ingredients by the impregnating material (pitch) within the confined and sealed blanks.

The tempering temperature Tt and the operating pressure Pb were maintained for a period of 8 hours to ensure that at least the major part of each and every blank in the autoclave was heated to tempering temperature. The heating unit was thereupon turned off to permit a cooling of the interior of the autoclave. The cooling step took up approximately 50 hours and resulted in a reduction of temperature of the thus obtained bricks to T2 = 250° C. At the same time, the pressure of the confined process gas and of the released ingredients of the impregnating material (pitch) dropped to P1 = $3.3 \times 10^5$ Pascal.

The pressure in the interior of the autoclave was thereupon reduced to atmospheric pressure by evacuation of surplus process gas, the autoclave was opened and the tempered blanks (i.e., fireproof bricks) were removed. Each brick consisted entirely of coke powder. A determination of the weight loss (i.e., of the difference between the weight of raw blanks and the weight of tempered blanks) revealed an internal coking rate of pitch in the range of 52 percent by weight.

EXAMPLE II

The procedure was the same as in Example I except that the maximum operating pressure Pb = $7 \times 10^5$ Pascal was reached before the temperature in the sealed autoclave rose to tempering temperature Tt. This was achieved by introduction of additional process gas (nitrogen) at a stage of the temperature raising step when the temperature in the autoclave rose to the coking temperature (Tv = 400° C.) of the impregnating material (pitch). Some of the process gas was withdrawn from the autoclave while the temperature was being raised from $Tv=400°$ C. to $Tt=740°$ C. in order to ensure that, once reached, the operating pressure ($Pb=7\times10^5$ Pascal) remained at least substantially constant, not only while the temperature was being raised from 400° C. to 740° C. but also during the period when the temperature was maintained at $Tt=740°$ C.

The rate of coking of impregnating material was at 56 percent by weight, i.e., even higher than in the Example I.

An important advantage of the improved method is that the blanks are cold (i.e., their temperature is below the threshold temperature Tg) during introduction into the autoclave which is designed to stand maximum internal pressures Ph exceeding the required or optimum operating pressure Pb which is to be maintained in the course of the tempering operation. The autoclave is unheated during introduction of the blanks into the housing 2 and the inert gas in its interior can be heated to raise the temperature of the blanks and to thereupon maintain the temperature at the tempering value Tt for an interval of time which is required to ensure that at least the major portion of each confined and sealed blank but preferably each and every portion of each blank in the housing of the autoclave is heated to the tempering temperature Tt.

When the tempering operation is completed, the interior of the still sealed autoclave is cooled to a temperature below the threshold temperature Tg before the valve 12 is opened to permit evacuation or withdrawal of some process gas in order to reduce the pressure in the housing 2 preparatory to removal of the closure 4 and withdrawal of tempered blanks via open end 3. The withdrawn tempered blanks are cold, i.e., their temperature is below the temperature Tg.

Another important advantage of the improved method is that the temperature of the blanks is raised above the threshold value Tg only while the blanks are confined and sealed in the autoclave. This ensures that harmful substances which are released by the blanks during confinement in the autoclave are prevented from escaping into the surrounding atmosphere. Moreover, it is much simpler and safer to control such harmful substances.

The tempering operation is carried out at an elevated pressure in order to ensure that a relatively high percentage of impregnating material is coked, i.e., the percentage of coked impregnating material is much higher than if the tempering operation were to be carried out at a lower pressure but at the same temperature. If it is desired to ensure that a predetermined percentage of impregnating material within each blank will be coked during tempering in the sealed autoclave, it is possible to reduce the quantity of impregnating material in the blanks. This brings about substantial savings in the initial cost of the blanks and, in addition, contributes to a reduction of the quantity of harmful substances which are released by the impregnating material in the course of the tempering operation, i.e., a reduction in the quantity of impregnating material renders it possible to achieve one of the most important objects of the present invention. The percentage of coked impregnating material can be increased by raising the operating pressure Pb during tempering of the blanks in the sealed autoclave. Therefore, it is often desirable to select an operating pressure Pb which is close to, e.g., only slightly below, the maximum permissible pressure Ph in the autoclave.

The raising of pressure in the sealed autoclave is a simple operation. Thus, all that is necessary is to reduce the pressure in the sealed but still unheated autoclave to a value Pv which is below atmospheric pressure and to thereupon admit process gas via conduit 15 in order to raise the pressure in the housing 2 to a starting pressure Ps of, for example, $10^5$ Pascal The pressure in the autoclave automatically rises above Ps as a result of the temperature raising step by the heating unit 10. If it is desired to temper the confined blanks at a high operating pressure Pb, the person or persons in charge will raise the starting or initial pressure Ps or additional process gas will be admitted via conduit 15 while the heating unit 10 is on to raise the temperature to Tt and to thereupon maintain the temperature at Tt for a required interval of time. As mentioned above, the percentage of coked impregnating material is higher if the operating pressure Pb is higher.

The valve 16 in the conduit 17 can be said to constitute a safety device which continuously monitors the pressure in the sealed autoclave and automatically permits withdrawal of some process gas via conduit 17 when the monitored temperature reaches or closely approximates the maximum permissible value Ph. Of course, process gas which is permitted to leave the interior of the autoclave 1 via conduit 17 is cleaned (e.g., by thermal afterburning) prior to being reused or prior to being discharged into the atmosphere.

Though it is possible to employ an oxygen-containing process gas, it is presently preferred to operate with an inert gas, such as nitrogen This is desirable and advantageous because oxygen could cause oxidation of the surfaces of heated blanks in the interior of the autoclave. This would affect the quality of the surfaces of tempered products and would necessitate a secondary treatment of such products with attendant changes of their dimensions. Moreover, substantial quantities of material of the tempered products would be lost as a result of removal of oxidized layers. Still further, it would be necessary to produce larger blanks if each of the tempered products (e.g., fireproof bricks or graphite electrodes) should have predetermined dimensions, i.e., it would be necessary to dimension the blanks by taking into consideration the percentage of oxidized material which would have to be removed from tempered products subsequent to their withdrawal from the autoclave. Such removal of oxidized layers is time-consuming and entails the development of large quantities of contaminants. All such problems can be avoided in a simple and inexpensive manner by employing an inert process gas. This effectively prevents the development of oxide layers since each heated blank is contacted only by inert gas (such as nitrogen), i.e., air is permitted to contact a raw or a tempered blank only while the blank is cold.

A further important advantage of the improved method is that it can be practiced by utilizing relatively small quantities of process gas. Thus, and as a rule, it is only necessary to admit a given quantity of process gas upon completion of the pressure reducing step (i.e., after the pressure in the sealed autoclave is reduced to Pv). This is in contrast to conventional methods which involve continuous admission of process gas in the course of the tempering operation, namely which require that a stream of process gas flow past the blanks in the sealed autoclave. A reduction of the required quantity of process gas is particularly important if the process gas is an inert gas. Moreover, it is possible to use a relatively expensive inert gas because the quantity of such gas is relatively small. Additional process gas will be admitted into the autoclave only if the operating pressure Pb is to be raised in addition to that pressure rise which takes place automatically as a result of heating of the interior of the sealed autoclave to the tempering temperature Tt. It is preferred to increase the coking percentage by raising the threshold pressure Ps; however, a higher operating pressure Pb (i.e., an operating pressure which is nearer to the maximum permissible internal pressure Ph) can be achieved by admitting additional process gas in the course of the temperature raising and maintaining steps or by raising the threshold pressure Ps and thereupon admitting some process gas while the heating unit 10 is on. Coking of the impregnating material takes place mainly when the temperature in the sealed autoclave reaches the value Tt; however, a certain amount of coking takes place while the temperature is being raised to Tt, i.e., as soon as the temperature rises to and begins to exceed the coking temperature Tv.

The rate of coking of impregnating material can be increased by ensuring that the pressure in the autoclave reaches the value Pb at a temperature Ts which is between the coking temperature Tv and the tempering temperature Tt. This can be achieved by the aforementioned expedient of raising the pressure Ps and/or by admitting additional inert gas. It is even possible to select the temperature Ts to match te temperature Tv. The operating pressure Pb is thereupon maintained at a constant value by the valve 16 and/or by the valve 12.

The process gas is preferably cleaned regardless of whether it is evacuated or withdrawn via conduit 13 or 17 during heating to the tempering temperature Tt, during that interval of time when the temperature in the sealed autoclave is maintained at Tt, or thereafter (to reduce the pressure in the housing 2 prior to opening) as well as on opening of the housing 2. As mentioned above, cleaning of the process gas prior to reuse or discharging into the atmosphere can involve thermal afterburning.

That percentage of process gas which is not evacuated or withdrawn during heating and/or for the purpose of reducing the pressure in the autoclave preparatory to removal of the closure 4 can remain in the autoclave for a certain interval of time to permit condensation of condensable ingredients prior to removal of tempered products. This ensures that the percentage of harmful ingredients in the process gas which fills the autoclave on opening of the housing 2 is relatively low. Condensate which gathers in the housing 2 can be removed and processed.

It has been found that the internal coking rate is very high if the operating pressure Pb (at the tempering temperature Tt) is between $10^6$ and $10^8$ Pascal, preferably between $10^6$ and $10^7$ Pascal. Internal coking rates of more than 70 percent by weight can be achieved at an operating pressure of $10^6$ Pascal (while the temperature in the autoclave equals Tt). The internal coking rate can be raised above 80 percent by weight if the operating pressure (at the tempering temperature Tt) is raised to $10^7$ Pascal.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of tempering carboniferous blanks which are impregnated with a carbonaceous impregnating material that release hydrocarbons and other harmful gaseous substances at normal pressure and above a threshold temperature, comprising the steps of confining the blanks in an autoclave having an interior which is maintained at atmospheric pressure and below said threshold temperature during said confining step; sealing the autoclave; reducing the pressure in the sealed autoclave below atmospheric pressure; thereupon admitting into the autoclave a process gas to raise the pressure in the autoclave above atmospheric pressure; raising the temperature in the sealed and gas-filled autoclave above said threshold temperature to a tempering temperature; maintaining said tempering temperature for an interval of time sufficient to ensure that at least the major portion of each confined blank is heated to such tempering temperature; interrupting the maintaining step and cooling the interior of the autoclave to a third temperature not exceeding said threshold temperature; thereupon reducing the pressure in the autoclave substantially to atmospheric pressure, including evacuating process gas from the interior of the autoclave; thereupon opening the autoclave; and removing tempered and cooled blanks from the autoclave.

2. The method of claim 1, wherein said normal pressure is approximately $10^5$ Pascal and the temperature of blanks prior to said sealing step is below said threshold temperature, said threshold temperature being approximately 300° C.

3. The method of claim 1, wherein said process gas is an inert gas.

4. The method of claim 3, wherein said inert gas is nitrogen.

5. The method of claim 1, further comprising the steps of monitoring the pressure in the sealed autoclave, withdrawing process gas when the pressure rises above a predetermined maximum value, and terminating the withdrawing step when the monitored pressure drops below said maximum value.

6. The method of claim 5, wherein said maximum value at least approximates a maximum permissible internal pressure in the autoclave.

7. The method of claim 5, wherein said maximum value is at least slightly below a maximum permissible internal pressure in the autoclave.

8. The method of claim 1, further comprising the step of introducing additional process gas into the autoclave during said maintaining step.

9. The method of claim 8, wherein said introducing step includes raising the pressure in the autoclave to a value which suffices to ensure that, at said tempering temperature, the pressure in the autoclave is slightly less than a maximum permissible internal pressure in the autoclave.

10. The method of claim 1, wherein said admitting step includes raising the pressure in the autoclave to a value which suffices to ensure that, at said tempering temperature, the pressure in the autoclave is slightly less than a maximum permissible internal pressure in the autoclave.

11. The method of claim 1 of tempering blanks which are impregnated with a material having a coking temperature below said tempering temperature, wherein said admitting step includes raising the pressure in the autoclave to a value such that the pressure in the autoclave rises to a predetermined operating pressure in response to heating of the interior of the autoclave to a temperature between said coking and tempering temperatures.

12. The method of claim 11, further comprising the step of withdrawing some process gas from the autoclave while the temperature rises toward said tempering temperature so as to maintain the operating pressure substantially constant.

13. The method of claim 1, further comprising the step of cleaning the evacuated process gas.

14. The method of claim 13, wherein said cleaning step includes thermal afterburning.

15. The method of claim 1, wherein the impregnating material releases into the process gas condensable ingredients during said maintaining step, and further comprising the step of condensing at least some condensable ingredients in the autoclave prior to said evacuating step.

16. The method of claim 1, further comprising the step of maintaining the pressure in the autoclave between $10^6$ and $10^8$ Pascal during said maintaining step.

17. The method of claim 16, wherein the pressure in the autoclave during said maintaining step is between $10^6$ and $10^7$ Pascal.

18. The method of claim 1, wherein said raising and maintaining steps include coking at least 35 percent by weight of carbonaceous impregnating material in the confined blanks.

19. The method of claim 1, wherein said raising and maintaining steps include coking at least 40 percent by weight of carbonaceous impregnating material in the confined blanks.

* * * * *